UNITED STATES PATENT OFFICE.

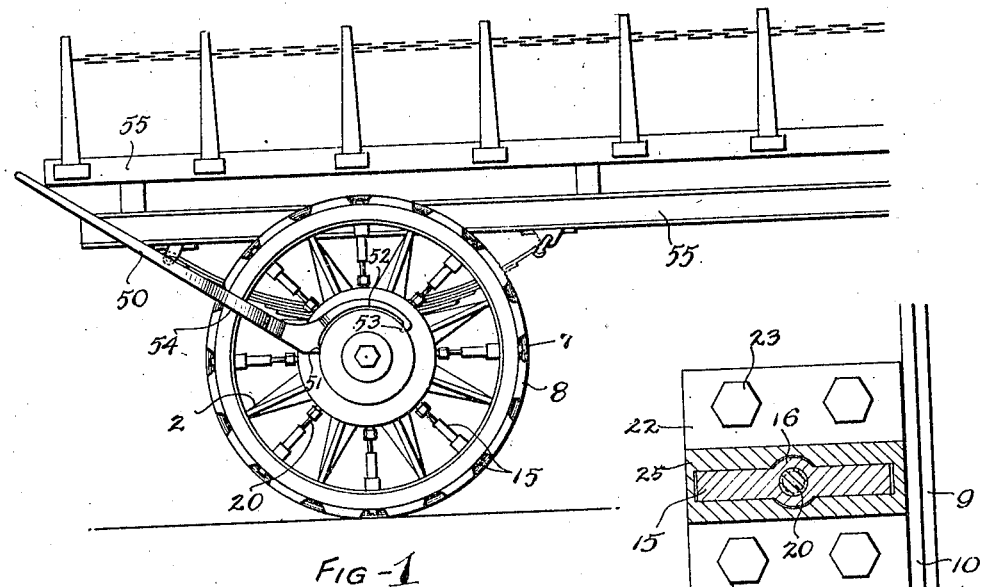
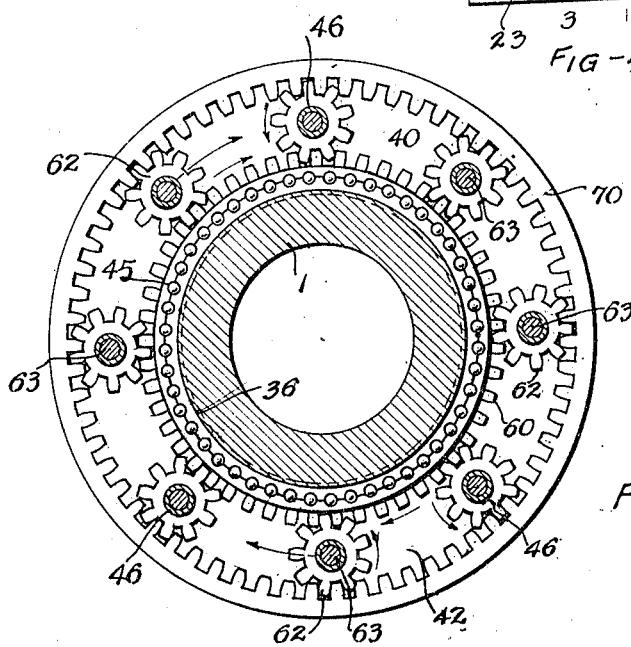
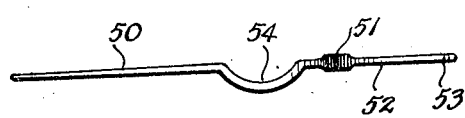

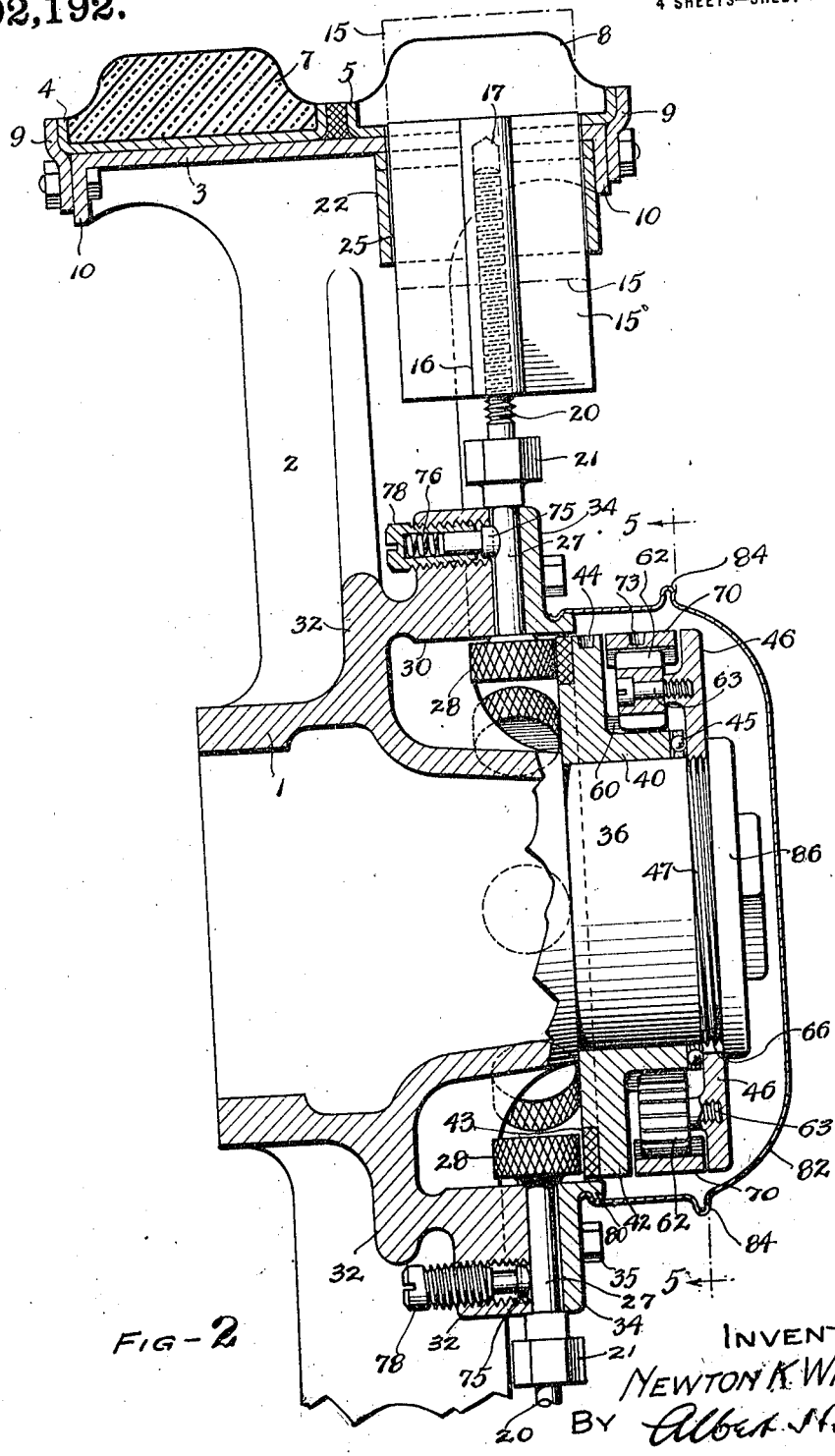

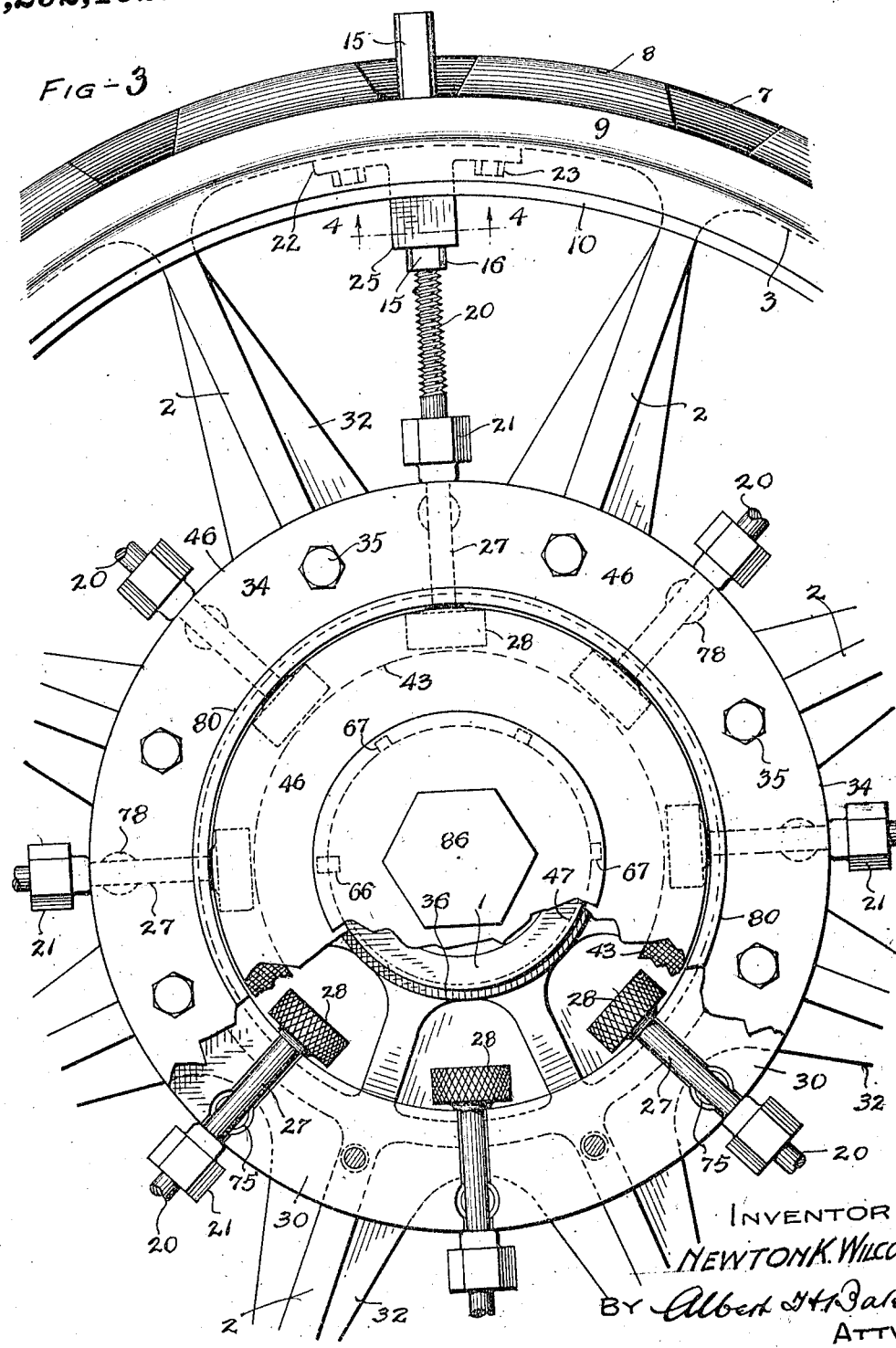

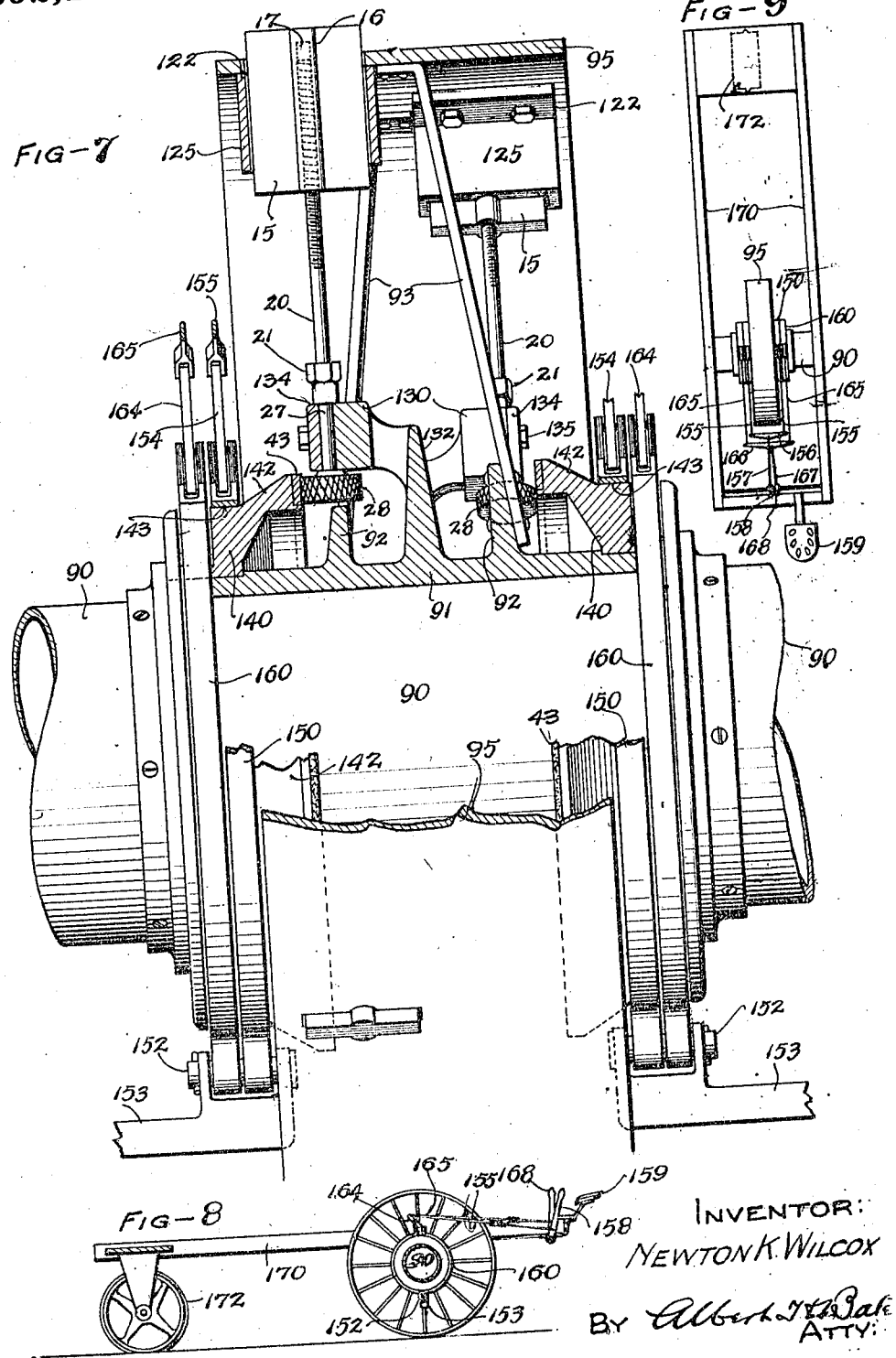

NEWTON K. WILCOX, OF PROVIDENCE, RHODE ISLAND.

TRACTION-WHEEL.

1,292,192.  Specification of Letters Patent.  Patented Jan. 21, 1919.

Application filed June 2, 1916. Serial No. 101,203.

*To all whom it may concern:*

Be it known that I, NEWTON KINCAID WILCOX, a citizen of the United States, residing at Providence, in the county of Providence and State of Rhode Island, have invented a certain new and useful Improvement in Traction-Wheels, of which the following is a full, clear, and exact description, reference being had to the accompanying drawings.

This invention relates to traction or propelling wheels of motor-driven vehicles, such as automobile trucks, tractors, and the like. Considerable difficulty has been experienced in providing a tread adapted for pavements and other unyielding road surfaces, and also adapted to firmly engage soft yielding ground so as to obtain sufficient traction. Various expedients have been resorted to for these purposes, such as the use of removable chains extending transversely across the tire or tread of the wheel, but these have been found expensive, inconvenient to apply, and, under many conditions, ineffective for propelling the vehicle.

The general object of this invention is to overcome the above difficulties by so constructing the traction wheel that it may have either the usual yielding tire tread or smooth surface, and may carry calks or spurs, adapted to be projected outwardly from the periphery of the wheel when it is running on yielding surfaces, and adapted to be withdrawn to points within the periphery when the wheel is running on hard roadways.

A more specific object is the provision of means for simultaneously moving the spurs outwardly or inwardly while the wheel is rotating and acting to support the vehicle. Other objects are to so arrange this mechanism that it may be simple, efficient and durable and adapted to either project or withdraw the spurs while the vehicle is running forwardly. Still another object is the provision of means for the operating of this mechanism from a point on the vehicle adjacent to the driver's seat, whereby it is unnecessary even to dismount from the vehicle to project or withdraw these spurs as roadway conditions warrant.

One embodiment of my invention is illustrated in the drawings and is hereinafter more fully described with reference thereto. The essential characteristics of the invention are set forth in the claims.

Referring to the drawings, Figure 1 is a side elevation of my traction wheel, showing the same mounted on a vehicle and one method of operating the spur-moving mechanism; Fig. 2 is a vertical transverse substantially central section through a wheel, on an enlarged scale; Fig. 3 is a partial side elevation of a portion of such wheel, some of the parts being partially broken away for clearness of illustration; Fig. 4 is a sectional detail of one of the spurs and guides, taken substantially on the line 4—4 of Fig. 3; Fig. 5 is a transverse section through a portion of the operating means, taken on a plane at right angles to the axis of the wheel, as indicated by the line 5—5 of Fig. 2; Fig. 6 is an edge elevation of a suitable spanner wrench, such as shown in use in Fig. 1, for causing the operation of the spurs; Fig. 7 is a transverse sectional view, partly in elevation, of a different form of wheel, illustrating my invention adapted thereto; Fig. 8 is a side elevation, on a reduced scale, illustrating a wheel, such as shown in Fig. 7, used in a tractor with a means for controlling the operation of the spurs from the driver's seat; Fig. 9 is a plan of the mechanism shown in Fig. 8. Figs. 8 and 9 are merely conventional views on a very much reduced scale.

Referring first to the arrangement shown in Figs. 1 to 5, 1 indicates a hub, 2 the spokes, and 3 the wide flat rim portion of a wheel formed by an integral casting, after the manner of the usual motor truck wheel construction. Carried on the rim 3, are annular trough-shaped members 4 and 5, shown as provided with separated rubber pads 7 and 8, forming a resilient tread for the wheel. In the form shown the member 7 may be a continuous rubber ring, or may be separated pads, staggered or offset with relation to the pads 8, providing, in effect, a continuous annular supporting surface, thereby eliminating vibration. The members 4 and 5 are shown as clamped in position by annular rings 9 secured to inwardly projecting annular flanges 10 of the rim 3.

Between the ends of the pads 8 are radial openings through the rim, through which the spurs 15 may be projected. These spurs preferably comprise substantially flat plates having ribs extending transversely of the same and radially of the wheel. These ribs are indicated at 16, and in the form shown, provide an additional thickness of metal around a central internally threaded opening 17, adapted to receive operating screws 20.

I prefer to provide guide members for the spurs 15 comprising cast brackets 22 having laterally extending flanges secured to the inner side of the rim 3 by bolts, indicated at 23, and having a radial hollow portion 25, slidably embracing the members. These guide members are preferably castings of a suitable non-friction metal.

The radial screws 20 are shown as provided with intermediate enlarged angular portions 21 and bearing portions 27, rigid at their inner ends with cylindrical knurled heads 28. The bearing portions 27 are rotatably embraced by radial bearing surfaces carried in a ring 30, shown as cast integral with the spokes 2, and also integrally connected with the spoke bracing webs 32, which are provided between the spokes 2. The outer portion of the bearings for the members 27 may be formed by registering grooves in a ring 34 secured to the ring 30 by suitable screws, indicated at 35.

In the embodiment shown there are eight of the spurs 15, with operating screws therefor which may be considered illustrative of any suitable number. The means for simultaneously rotating the screws 20 and thereby moving the spurs 15 inwardly or outwardly, depending on the direction of rotation, will now be described.

Rotatably embracing the cylindrical surface 36 on the hub of the wheel, is a ring 40 having an outwardly projecting flange 42, to which is rigidly secured a friction ring 43 and carried in a suitable rabbet formed in the inner face thereof. At the outer edge of this ring is provided a ball thrust bearing 45, one side of which engages the inner face of an annular securing member 46 engaging threads 47 on the hub.

It will be seen that the member 46 may be screwed along the hub toward the ring 40, thereby urging this ring, with its friction ring 43, toward the outer sides of the knurled heads 28 for the operating screws. In the periphery of the flange 42 of the ring 40 may be provided suitable openings or depressions 44 for the reception of a spanner wrench, whereby this ring may be held against rotation while the wheel is revolved, resulting in causing the outer sides of the knurled heads 28 to be held, or, in other words, moved rearwardly with relation to the wheel, which, in the form shown would result in turning the screws 20 in a direction to move the spurs 15 outwardly.

The spanner wrench is shown as having a long handle or arm 50 (Figs. 1 and 6), a shoulder or abutment 51, and the usual arched portion 52, an offset portion opposite the wheel rim, as at 54, and provided with a projection 53 at its end adapted to engage the opening 44 in the flange of the ring 40.

This spanner wrench is shown in use in Fig. 1, which illustrates its arm 50 merely abutting the under side of the truck frame 55 whereby the member which the wrench is engaging may be held against rotation while the truck is moved forwardly. It will be seen that the spurs may be withdrawn by merely reversing the position of the wrench on the flange of the ring 40 and holding the handle thereof with a chain; or projecting its handle forwardly, allowing it to abut the under side of the truck frame at the other side of the wheel, whereupon the reversing of the rotation of the wheel (by running the truck backwardly) will result in withdrawing the spurs.

To eliminate the necessity of the reversing movement of the truck just described, for withdrawing the spurs, I prefer to provide means carried by the hub and acting on the ring 40. This means will now be described.

On the outer side of the ring 40, extending from its flange to the outer edge, are provided spur gear teeth 60 meshing with planetary pinions 62 rotatably carried on studs 63, shown as threaded into the member 46, heretofore described. This member is preferably held against rotation on the hub of the wheel by means of a key 66 engaging a suitable keyway in the hub and one of several coacting keyways 67 in the ring, which may be rotated on the hub to adjust the pressure of the member 40, on the screw heads. The member 46 is shown as projecting outwardly past the pinions 62 to provide a guide for a ring 70, having spur gear teeth on its inner periphery meshing with the planet 62. This ring is rotatable independently of the ring flange 42 or the member 46, and is positioned by the planet pinions, flange 42, and the outer portion of this member 46, and preferably has, in its outer periphery, suitable spanner wrench openings 73, corresponding to the opening 44.

The operation of the mechanism for reversing the movement of the spurs is as follows. Assuming the wrench 52 to be in the position shown in Fig. 1, engaging the ring 70, the truck is now moved forwardly by starting its motor, and this ring 70 is held against rotation while the wheel, spurs, and the spur operating screws, as well as the member 46 and the planets 62, are all carried bodily with the wheel. As the planets 62 are moved bodily around with the wheel, and as they are engaged by the non-rotating ring 70 at their outer sides, they are caused to rotate on their own axes in the direction of the arrows in Fig. 5, with the result that the ring 40, which tends to rotate with the wheel, is given an additional forward movement in the same direction as the wheel, resulting in this ring rotating faster than the wheel and in the same direction. This movement of the ring 40 causes the outer sides of the heads 28 to move with it, rotating them in a direction opposite that previously described, and causing the screws to draw inwardly on the spurs.

In order that the friction ring 43 may engage each of the heads 28, with substantially the same force, thereby insuring uniform and simultaneous movement of the spurs, the bearings for the portions 27 are preferably elongated, allowing play in a direction parallel with the axis of the wheel, and each of these heads is urged toward the friction ring by plungers 75 actuated by a spring 76, the tension of which may be adjusted by hollow screw members 78 threaded into the ring 30 and serving to guide the plungers. In the lower portion of Fig. 2 the screw 78 is shown in a position where the pressure of the springs 76 is released, with the result that the corresponding head 28 is allowed to stand slightly spaced away from the ring 43.

To protect the mechanism operating the spurs from dust, dirt, mud and the like, I have shown an outwardly projecting beaded flange 80, adapted to receive the inwardly turned edge of a cup-shaped cap 82 extending over this mechanism and across the usual hub cap or nut 86, and adapted to hold itself in position by a yielding engagement with the bead 80. At 84 is shown an outwardly extending bead formed in the metal of the cap 82 and providing a means for facilitating its removal. The other side of this operating mechanism is protected by the ring 30 and parts connecting it with the wheel hub.

Figs. 7 to 9 inclusive illustrate the invention embodied in a wheel of different construction and particularly adapted for use in such vehicles as farm tractors. 90 indicates a suitable shaft bearing rotatably embraced by a hub 91, carrying flange-like projections 92, to which are secured spokes 93, shown in the form of metal bars, having their outer ends secured to a substantially cylindrical rim 95. On the inner side of this rim are two rows of brackets 122 having hollow guide portions 125 slidably embracing the spurs 15. The brackets and spurs of one row are preferably staggered or offset with relation to those of the other row.

The spurs are adapted to be operated in the same manner as previously described, but the screw members 20 are shown as having their bearings 27 carried in separated bearing members 130 rigid with an intermediate flange 132, it being necessary to leave space between these bearing members for the spokes 93. These separate bearings may have individual caps 134 secured by screws 135.

The rings for actuating the heads 28 of the screws are indicated at 140 and are shown as having inwardly projecting flanges 142 carrying the friction rings 43. These rings 140 are rotatable on the hub 91 and are provided with cylindrical surfaces 143 adapted to be embraced by brake bands 150, shown as comprising two halves pivoted at 152 to a rigid member 153 and adapted to be drawn together at one side by levers indicated at 154, operated by links 155. These links are shown in Fig. 9 as connected with an equalizing bar 156 intermediately pivoted to a link 157 adapted to be operated by a hand lever 158 adjacent the driver's seat, indicated at 159. This seat is shown as mounted on the rear of a tractor frame 170 in which is journaled the bearing 90 for the traction wheel. The tractor may have a suitable steering wheel 172 and stabilizing wheels (not shown), positioned at either or both sides of the frame. This is illustrative of any tractor construction, as it is obvious that one, two or more, traction wheels on a single vehicle may be provided with my device.

Thus, by operating the lever 158, the brake bands 150 are contracted onto the rings 140, holding them against rotation while the wheel, which is driven by any suitable means, may revolve in one direction with relation thereto, causing an outward movement of the spurs 15. The reversing mechanism, which may be of the construction previously described, may have its operating ring (corresponding to the ring 70), actuated by brake bands 160 pivoted at 152 to the members 153 and operated by levers 164, connected with the links 165, which are in turn connected to an equalizing bar 166, intermediately pivoted to a link 167 operated by a hand lever 168, also adjacent to the driver's seat.

Thus, after the spurs have been moved outwardly, when it is desired to withdraw them to a position within the periphery of the wheel, the bands 160 may be contracted upon their operating rings by drawing on the lever 168. This results in holding these rings against rotation, which, (by the operation previously described), causes the rotation of the ring 140 in the same direction as the revolution of the wheel. Thus the screws 20 are rotated in the direction for drawing inwardly on the spurs.

Any of the spurs may be operated independently of the others by applying a suitable wrench to the angular portions 21 on the screws 20. If any considerable movement is to be given the spurs by such a manual operation, it is desirable to loosen the pressure of the springs holding the heads of these screws against the friction ring.

From the foregoing description it will be seen that I have provided a traction wheel which may have a comparatively smooth tread, either resilient or solid, and thus may be used for any ordinary purposes. When it is desirable to have projections on the periphery of the wheel for propelling the vehicle through soft material, my mechanism may be very conveniently operated to project spurs outwardly from the periphery of the wheel any desired distance commensurate with the conditions of the roadway. For example, if the wheel is buried deeply in the mud, the spurs may be projected several inches, if necessary, to cause such an engagement that sufficient traction is provided to move the vehicle. As soon as a harder roadway is reached, the spurs may be withdrawn to the desired position with equal convenience.

The guide brackets closely embracing the spurs prevent lateral strain on the screws 21, which may readily be made of sufficient strength to stand any longitudinal strain to which they may be projected. The enlarged intermediate portions 21 having a thrust bearing against the outer sides of the journals for the screws causes the hub of the wheel to take this strain. When a wheel is once provided with my invention the convenience of operation and durability of the parts saves not only the operator's time but saves the expense of inefficient devices heretofore used, which, as a rule, must be frequently replaced.

Having thus described my invention, what I claim is:

1. In a traction wheel, the combination with the wheel proper, of movable spurs mounted thereon, two mutually independent rotatable members located at the side of the wheel, both connected with said spurs to move the same inwardly and outwardly respectively when said members are retarded in rotation with reference to the speed of rotation to the wheel, and means operable from the vehicle while it is moving for applying a brake to either of said members as desired.

2. The combination of a wheel, a movable spur thereon, a ring carried by the wheel and rotatable with relation to it, mechanism connecting said wheel with the spur to provide a rotation of said member relative to the wheel in one direction to project the spur and in the other direction to withdraw the spur, gear teeth on said ring, a planet engaging said gear teeth and driven bodily with the wheel, another ring having gear teeth engaging said planet, and means for retarding either ring.

3. In a device of the character described, the combination of a wheel, a plurality of spurs movably carried by the wheel, a moving element for each of said spurs, a member rotatable with relation to the wheel for operating said moving elements when the wheel is rotated in one direction with relation thereto, and means rotatably carried by the wheel and acting on the rotatable member for causing its movement in the other direction with relation to the wheel.

4. The combination of a wheel, a plurality of spurs movably carried by the wheel and adapted to be projected outwardly therefrom, a radiating screw for each of said spurs adapted to cause its movement with relation to the wheel, each of said screws being rotatable on its own axis and having a rigid knurled head, a prime mover coacting with each of said heads rotatably mounted on the wheel and including a ring of yielding substance engaging the heads.

5. The combination of a wheel, a plurality of spurs movably carried thereon, a device for moving each of said spurs having a rotatable driving element, a member rotatably carried on the wheel and acting as a prime mover for said driving elements and adapted when held against rotation while the wheel is rotating in one direction to move said spurs, a separate rotatable member, and means connecting the two rotatable members whereby when the latter is held against rotation a reverse movement is given to said prime moving element and spurs.

6. The combination of a wheel, a plurality of movable spurs, a screw for operating each of said spurs having a driving portion, a ring rotatable with relation to the wheel coacting with said driving portions and acting as a master mover for rotating the screws simultaneously, gear teeth on said ring, a planet engaging said gear teeth and driven bodily with the wheel, a gear engaging said planet and adapted to be moved relative to the wheel for causing the reverse movement of said prime mover.

7. The combination of a wheel, a plurality of movable spurs, a screw for operating each of said spurs, a ring rotatable with relation to the wheel and acting as a master mover for driving each of the screws simultaneously, gear teeth on said ring, a planet engaging said gear teeth and driven bodily with the wheel, a ring surrounding said planet and first mentioned gear teeth and adapted to be moved relative to the wheel for causing the reverse movement of said prime mover.

8. The combination of a wheel, a plurality of radially movable spurs, a screw for operating each of said spurs, a master mover for driving each of these screws simultaneously, gear teeth on said master mover, means holding the master mover while the wheel is rotating, a planet engaging said gear teeth and driven bodily with the wheel, a ring surrounding said planet and first mentioned gear teeth and adapted to be held against movement while the wheel is rotating for causing the reverse movement of said master mover.

9. The combination of a wheel, a plurality of movable spurs adapted to be projected outwardly from the rim or withdrawn within the same, a screw for operating each of said spurs having a head, a ring rotatable with relation to the wheel coacting with the heads of each of these screws simultaneously, gear teeth on said ring, a planet engaging said gear teeth and driven bodily with the wheel, a ring surrounding said planet and first mentioned gear teeth and adapted to be moved relative to the wheel for causing the reverse movement of said prime mover, bearings for said screws, a cap, means carrying said bearings by the hub and serving to house a portion of said operating mechanism, and a cap extending over the other portion of said operating mechanism.

10. The combination with a wheel, of a plurality of movable spurs adapted to be projected past the rim of the wheel, means for moving said spurs inwardly or outwardly including two members rotatably carried by the wheel, one adapted to cause outward movement and the other adapted to cause inward movement of the spurs, brake devices adapted to hold said members against rotation while the wheel is revolving, and means controlled from the driver's seat for operating said brake devices.

11. The combination of a wheel, a plurality of spurs movably carried by the wheel and adapted to be projected outwardly therefrom, a radiating screw for moving each of said spurs, each of said screws being rotatable on its own axis and having an enlarged driving portion, a prime mover having a circular frictional member coacting with each of said driving portions on the screws, bearings for said screws permitting their movement toward and away from the prime mover, and means for adjusting the pressure of said driving members against the frictional member.

12. The combination of a wheel, a plurality of spurs movably carried by the wheel and adapted to be projected outwardly therefrom, a radiating screw for each of said spurs adapted to cause its movement with relation to the wheel, each of said screws being rotatable on its own axis and having a rigid knurled head, a prime mover coacting with each of said heads, and having a yielding substance engaging the heads, bearings for said screws permitting movement toward and away from the prime mover, yielding means for urging the screw heads toward the prime mover, and means for adjusting the pressure with said yielding means.

13. The combination with a driving wheel for a vehicle, of a plurality of spurs carried thereby and adapted to be projected beyond the periphery or be withdrawn to a position inside of the same, means for simultaneously moving said spurs inwardly or outwardly including individually rotatable devices having round members and a master member rotatably mounted on the wheel and having frictional engagement with said round members and adapted normally to cause the movement of the spurs when rotated with relation to the wheel, while allowing slippage between the master member and rotatable devices in case of undue obstruction.

14. In a traction wheel, the combination of a wheel body, a plurality of radially movable spurs adapted to stand within the periphery of the wheel body or be projected beyond the same, radially positioned screws for operating said spurs, a member carried by the wheel and rotatable with relation thereto, and a yielding ring on said member engaging round heads on the screws, whereby the spurs may be simultaneously moved.

In testimony whereof, I hereunto affix my signature.

NEWTON K. WILCOX.